E. E. SCHMIDT.
CHECK.
APPLICATION FILED JAN. 18, 1919.

1,316,651.

Patented Sept. 23, 1919.
2 SHEETS—SHEET 1.

E. E. SCHMIDT.
CHECK.
APPLICATION FILED JAN. 18, 1919.

1,316,651

Patented Sept. 23, 1919.
2 SHEETS—SHEET 2.

Witnesses.
Clarence Perdew
Irene Parker.

Inventor.
Ernest E. Schmidt
By James W. Ramsey
Attorney

UNITED STATES PATENT OFFICE.

ERNEST E. SCHMIDT, OF COVINGTON, KENTUCKY.

CHECK.

1,316,651.

Specification of Letters Patent. Patented Sept. 23, 1919.

Application filed January 18, 1919. Serial No. 271,801.

*To all whom it may concern:*

Be it known that I, ERNEST E. SCHMIDT, a citizen of the United States, and a resident of Covington, in the county of Kenton and State of Kentucky, have invented certain new and useful Improvements in Checks, of which the following is a specification.

My invention relates to bank checks and the like, and its object is to provide a simple safeguard against the payment of a "raised" check.

My invention consists in the new and improved article of manufacture and in the combination of parts comprised in said article and in the details of construction and arrangement of these parts, as well as in the improved method of use of said article, all of which will be hereinafter more fully described and claimed.

In the drawings:

Figure 1 is a facsimile of a check constructed and used according to my invention as I prefer to construct and use it, and showing by dotted lines the use of an ordinary writing pen therewith; and Fig. 2 is a similar view showing a modification.

As I prefer to construct and use my invention and as shown in Fig. 1, the check is made up of an ordinary oblong piece of paper or the like as is usual in making bank checks. It will be understood that this check may be loose from any other check, as when it is used as a "counter check" in a bank, or it may be assembled with a number of other checks, which may or may not be similar thereto, in a check book; and this assembly may be according to any desired method, as, for instance, each check may form a leaf of the book and be attached at one end or side only, or a number of such checks may be comprised in a leaf of the book with proper perforations for separating the checks as they are used. Also, any of the desired adjuncts of a check book may accompany the checks; as, for instance, the leaves or spaces for accounting and the like.

Also, the face 1 of the check is of usual composition and arrangement, comprising spaces for the check number, date, name of payee, amount in numerals and amount in writing, and finally a line for the signature of the drawer of the check. It will be understood that this much of the check is old and well known and may be as shown and described, or may be modified in any desired manner, as is well known in the composition and arrangement of check forms. It will also be understood that either the face or the back may bear any additional designations or have any desired spaces for accounting or the like; as when the check is provided in the form of a voucher or the like. In fact, none of the usual provisions on bank checks interfere with my invention; nor does my invention impair any of the functions of any such desired ordinary provisions or adjuncts of the bank check or the like.

With the interior of the space thus provided for the ordinary matter of a bank check, the margins of the check, preferably at bottom, top and both ends thereof, are utilized for the provision of a series of amount designations in convenient arrangement for indicating by a single means any desired one of the designations. In association with these, there is provided upon the face of the check a caution 2 as to how reference is to be made to the marginal indications as a guide to correct payment of the check.

It is, of course, desirable to give to the marginal designations a range as high as possible, and, as to the designations of the lower amounts especially, to have conveniently small intervals between each two designations. Usually the intention is not to designate exactly the amount written on the face of the check, but to designate an approximate amount which should not be exceeded in payment of the check. Thus, in the example, the check is drawn for "$4128.52" and the indicated designation 3 in the margin is "4150". The next lower designation 4 is "4100" and the next higher designation 5 is "4200". It is deemed sufficient to have such a wide approximation in the larger amounts because of the difficulty of cashing a check drawn for a large amount. It is a fact that persons practising the "raising" of checks very seldom use checks which have originally been drawn for more than one hundred dollars. In the example as shown, the designations begin "1", "5", "10" and then increase by tens to "500"; then by twenty-fives to "1000" and from there the increase is by fifties. At the bottom 6 and at the top 7, the designations to are arranged in tiers 8 of three designations each, the tiers succeeding each other from left to right along the bottom 6 and from right to left along the top 7. At the ends 9 and 10, the designations are placed in succession running from bottom to top at the right end 9 and from top to bottom at the left end 10. The entire arrangement is such that every designation reads horizontally along the check from left to right in the manner most convenient for reading it. By this arrangement in the example shown, the designations run to "5700". It will be understood that the intervals between the designations may be increased or diminished, or the number of designations to a tier 8 may be increased or diminished, or the size or spacing of the designations may be varied, so that a greater or less range may be afforded. I deem it desirable, however, to have a fairly close approximation of any desired amount among the designations of lower amounts; and it will be understood that any of these provisions may vary according to the circumstances encountered, or the desires of the bank or other concern or individual using or providing the checks.

Although it is highly desirable to utilize as much as possible of the marginal space for these designations in order to have a fairly close approximation of any given amount, and at the same time have as large as possible range of amounts, I do not, according to my invention, use the corner spaces 11 of the check for any of these designations. These corner spaces are left empty of designations, although they may bear any other desired matter, as, for instance, the dollar signs, as shown in the example. The checks are extremely liable to be torn at their corners, especially checks that are originally assembled with other checks in a book; this tearing of the corners occurring accidentally as the check is being torn from the book. If these corner spaces bear any of the designations, confusion in the subsequent use of the check is unavoidable; but if these spaces are merely blank or contain some ornamental or other matter not essential in the subsequent use of the check, such confusion is avoided. This is especially true where the marginal designations are indicated by removing part of the material of the check as in the preferred use illustrated herein. In that case, should the check have had designations in a corner space and part of this corner material had been accidentally removed, the bank official would not be justified in paying the check according to my invention because he would not be sure whether the corner space had contained a correct indication or not, or whether the removal of the corner material was meant for an indication.

In the example of Fig. 1, only such approximation of the exact intended amount of the check is possible as is permitted by a single marginal designation; and as before explained, it is the intention that the check should not be paid for a larger amount than is designated by the marginal designation indicated.

Variation of this, however, is possible according to the principle of my invention, as is instanced in the example of Fig. 2, where a plurality of marginal designations are indicated and the highest amount for which it would be correct to pay the check is ascertained by adding together the amounts designated by the plurality of designations.

The possibility of use of a check in which the number of marginal designations is limited to one, and, concurrently, the use of a check permitting more than one marginal designation, greatly decreases the effectiveness of the check permitting only the lower number of designations. For if the bank officials and employees become familiar with the check permitting more than one designation, and requiring these to be added, and then there also come before them a check of the kind shown in Fig. 1 which permits only one marginal designation, confusion in the mind of the official or employee is possible, so that he would probably pay a check of the kind shown in Fig. 1 which had been raised and its marginal indication raised by providing it with more than one marginal designation. For instance, if the check shown in Fig. 1, permitting only the payment of $4150.00, should have its face changed to call for $4188.52 by sustituting an "8" for the "2" in the written amount, the amount designated in the margin could be raised by indicating "40" at the bottom near the left end. Thus altered, this check might be readily paid by a bank if confusion occurred between this check and checks of the other kind wherein the designation of the two amounts, "4150" and "40" to be added together and thus give a close approximation to $4188.52, would be correct. In this way the check would be paid for sixty dollars more than the amount for which it was drawn, due to the confusion between it and some other kind of check, possibly in contemporary use.

Therefore, while the marginal designation or designations may constitute a safeguard against all probable material alteration of the written face of the check, a further safeguard against improper use of the marginal designations is required in order to provide a thoroughly practicable and reliable check.

I provide this by placing upon the face of the check a brief direction as to how many marginal indications are permissible, together with direction not to pay more than the lowest amount indicated, either upon the margin or upon the face of the check. Thus, in the example of Fig. 1 where only one marginal designation is permissible, the direction is as follows: "More than one marginal indication makes check void. Pay not over lowest amount indicated." Preferably, the word "one" in these directions has its letters intricately formed somewhat after the manner of the engraving on a bank note. This serves to prevent the changing of this word in the directions to permit of more than one marginal indication.

In the modification of Fig. 2, the designations begin at the left at the bottom of the check with two tiers of ciphers, and the next three tiers read from "1" to "9" and the succeeding ones read to "1000" by tens and then by fifties to "4650". This check is shown made out for the same amount as the example of Fig. 1, and it will be seen that "$4129.00" is indicated in the margin; thus approximating within forty-eight cents of the intended amount. This is done by indicating "4100" at the top and "20" and "9" at the bottom, the amounts of these three designations added together showing the highest amount for which it would be permissible to pay the check. This check has the advantage of thus more closely approximating the intended amount with its marginal designations; but it is more inconvenient both for the drawer and payer, the former having to locate three designations in the margin and the latter having to note these three before paying the check. In the example of Fig. 1, the work of drawing the check, as well as the attention required in paying it, is much less; but at the same time the approximation is close enough for all practical purposes. Also, the less the number of marginal indications that must be made and consulted by the drawer and payer, respectively, the less chance there is for mistakes. However, it will be understood that the use of more than one designation may be desirable in some cases; and, as before stated, it is necessary to carefully distinguish these different systems from each other by some such method as that exemplified. In this modification of Fig. 2, in accordance with this method, the check bears the directions 2', as in Fig. 1 except that "three" instead of "one" is contained therein, and this preferably, as shown, is made up of intricately formed letters so that it could not be changed to a word indicating a higher permissible number of marginal indications.

It will be understood that in either example the wording, as well as the lettering, of these directions may be varied to suit requirements, and it is not essential in all cases that any of the wording should be of intricate lettering; although this is desirable for the reasons just given.

In the check permitting a plurality of marginal indications as in Fig. 2, it is of course not necessary always to use the full number of permitted indications to designate the required amount. Thus, if the amount for which the check was drawn were "$28.52" it would be necessary only to indicate "20" and "9" in the margin; or if the check were "$8.52" only "9" need be designated in the margin. Thus, in these instances, only two and one of the designations, respectively, would be needed. Where only two are used, if the directions on the check permit of three indications, the person desiring to raise the check could, if permitted to make the third indication in the margin, indicate practically any amount he desired in the range of the designations and raise the check accordingly; and if permitted to choose the location of two of the three permitted designations, would have still greater freedom of the choice of the amount to which the check is to be "raised". I prevent this by providing for locating the indications not needed in such a manner that they will not affect the total marginal designation. Thus, as shown in Fig. 2 by the dotted lines, the one superfluous marginal indication would be located in either one of the tiers of ciphers 8' at the beginning of the series; and if there were two superfluous indications, one of them would be placed in each tier 8'. It will be understood that if the check permitted of four marginal indications, then it should have three tiers of ciphers, so that either one, two or three superfluous marginal indications could be located without affecting the total marginal designations. Likewise, with any greater or less number of permissible marginal indications.

It will be seen that if the check is thus provided with the maximum number of marginal indications at the time it is drawn, the person who would raise the check has no opportunity to alter the marginal designation as he would were he permitted to choose the location of one or more of the indications.

In accordance with my invention, the marginal indication is made by removing part of the material of the check margin. However, it is preferred that the material containing the indicated designation should not be removed as is the case with many cards, checks, tickets and the like which have amounts designated thereon by punching. Also, it is desirable that the removal of the check material should extend out to edge, leaving an open notch rather than merely a hole in the check. Such a removal of material is altered or replaced with far greater difficulty than a mere interior opening, such as usually provided by a punch. Moreover, punches are expensive, and to provide a punch for each check user would be very burdensome to a bank desiring to supply its customers with checks made and used according to my invention. The most preferable form of removal of the check material is one in which a rather long pointed notch is left with the point of the notch directed toward the designation indicated, as seen at 12 in Fig. 1.

According to my invention, such a notch may be very conveniently made in the check by placing an ordinary pen-point with its back down upon the margin of the check and with the point directed toward the designation that is to be indicated. The pen is firmly held down on the check in this position while the check rests upon some firm surface and then the opposite edge of the check is lifted and the check drawn over so that the pen-point pierces the paper, after which a further pulling on the check causes the lateral edges of the pen-point to shear out the check material neatly and leave the notch 12. The correct position of the point 13 of the pen 14 is shown by the dotted lines in Fig. 1 where it will be seen, were the above described operation performed, the amount "3300" would be indicated. Such a removal of part of the check material leaves a ragged edge in the notch which is not readily repaired by inserting other material.

The closely arranged numerals around the margin of the check also impart to the face of the check the appearance of an elaborately engraved document, as is desirable in articles of this kind, and such marginal arrangement of the designations thus adds to rather than detracts from the appearance of the check.

Where the marginal designations are arranged in tiers, it is preferred that the designations increase in value from the interior of the check out toward the edge in each one of the tiers. This makes it impossible to raise the designated amount by prolonging the indicating mark inwardly of the check as would be the case were any of the tiers arranged so that their designations decrease in value outwardly.

It will be understood that though the examples provide for indication of even dollars only, slight modifications according to this principle will permit of indication of cents also. Likewise, the checks are adaptable to other monetary systems to indicate units or fractions of units.

It will be understood that my improved check may be used without the part of the caution 2 or 2' which specifies the number of indications permissible, so that this caution will consist of the direction to pay not over the lowest amount indicated. However, the omission of such part of the caution makes possible the confusion hereinbefore alluded to.

In any case it is preferable to also have on the face of the check a caution against payment thereof should all of the marginal designations have been removed, leaving it like any ordinary unprotected check. Thus, in the examples herein I also provide the caution 15, reading "Void unless bearing marginal figures for indication of maximum payable amount."

It will be understood that although marginal designations and indications are repeatedly referred to herein and all of the elements are described as appearing upon the face of the check, it may be desirable under some conditions to vary the relative location of certain elements, as, for instance, some or all of the designations might be arranged other than upon the margin, or it might be necessary or desirable to arrange some of the elements upon the back of the check or upon any suitable attachment thereto. In view of such contingencies as these, therefore, while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. As a new and improved article of manufacture, a check of usual substantially rectangular formation, having the usual space wherein to indite an indication of the amount for which the check is intended to be drawn, and bearing, along one of its exposed edges, a plurality of designations, some of which, by means of a simple indelible indication leaving said check of its original substantially rectangular shape and of its original length and width and with said exposed edge otherwise intact without any material isolated projection, will indicate the maximum amount for which it is permissible to pay the check, and bearing a permanent caution as to how many of said simple indelible indications are permissible in conjunction with said designations, whereby care as to exact positioning and precaution against alteration of any indited matter on said check are rendered unnecessary.

2. As a new and improved article of manufacture, a check having a space for indicating the amount for which the check is intended to be drawn, and having a plurality of designations, a plurality of which may be indicated to aggregate the maximum amount for which the check may be paid, and another designation on said check indicating zero amount and adapted to have a superfluous indication associated with it when the maximum number of indications possible to use on the check is not needed to designate said maximum amount.

3. As a new and improved article of manufacture, a check having a space for indicating the amount for which the check is intended to be drawn, and having a plurality of designations, a plurality of which may be indicated to aggregate the maximum amount for which the check may be paid, and another designation on said check indicating zero amount and adapted to have a superfluous indication associated with it when the maximum number of indications possible to use on the check is not needed to designate said maximum amount, and a caution on said check specifying how many of said indications may be used to designate said maximum amount.

4. As a new and improved article of manufacture, a check having a space for indicating the amount for which the check is intended to be drawn, and having a pluralty of designations, a plurality of which may be indicated to aggregate the maximum amount for which the check may be paid, and another designation on said check indicating zero amount and adapted to have a superfluous indication associated with it when the maximum number of indications possible to use on the check is not needed to designate said maximum amount, and a caution on said check specifying how many of said indications may be used to designate said maximum amount, the part of said caution which represents the number of said indications being intricately formed on said check, for the purposes set forth.

5. As a new and improved article of manufacture, a check having a space for indication of its amount, and bearing a plurality of designations, some of which, by proper indication, will indicate the maximum amount for which it is permissible to pay the check, and bearing a caution as to how many indications are permissible in conjunction with said designations, the part of said caution which represents the number of said indications being intricately formed on said check, for the purposes set forth.

ERNEST E. SCHMIDT.

Witnesses:
JAMES N. RAMSEY,
CLARENCE PERDEW.